United States Patent [19]

Kikuchi et al.

[11] Patent Number: 5,716,545
[45] Date of Patent: Feb. 10, 1998

[54] ANTIFERROELECTRIC LIQUID CRYSTAL COMPOSITION

[75] Inventors: Katsuhide Kikuchi; Yoshimasa Hijikata; Hitoshi Hayashi, all of Nishio, Japan

[73] Assignee: Nippon Soken, Inc., Nishio, Japan

[21] Appl. No.: 772,992

[22] Filed: Dec. 23, 1996

[30] Foreign Application Priority Data

Dec. 28, 1995 [JP] Japan .................... 7-343952

[51] Int. Cl.$^6$ .................... C09K 19/12; C09K 19/20; C09K 19/52
[52] U.S. Cl. .................... 252/299.65; 252/299.01; 252/299.66; 252/299.67
[58] Field of Search .................... 252/299.01, 299.65, 252/299.66, 299.67

[56] References Cited

U.S. PATENT DOCUMENTS

| | | | |
|---|---|---|---|
| 4,576,732 | 3/1986 | Isogai et al. | 252/299.65 |
| 4,754,051 | 6/1988 | Sasaki et al. | 560/8 |
| 4,780,242 | 10/1988 | Miyazawa et al. | 252/299.65 |
| 4,921,632 | 5/1990 | Nakamura et al. | 252/299.01 |
| 4,961,874 | 10/1990 | Takeuchi et al. | 252/299.6 |
| 5,046,823 | 9/1991 | Mori et al. | 359/56 |
| 5,110,498 | 5/1992 | Suzuki et al. | 252/299.96 |
| 5,116,531 | 5/1992 | Hagiwara et al. | 252/299.65 |
| 5,151,213 | 9/1992 | Reiffenrath et al. | 252/299.6 |
| 5,171,471 | 12/1992 | Suzuki et al. | 151/199.61 |
| 5,184,847 | 2/1993 | Suzuki et al. | 252/299.65 |
| 5,204,020 | 4/1993 | Suzuki et al. | 252/299.67 |
| 5,207,946 | 5/1993 | Numazawa et al. | 252/299.65 |
| 5,207,947 | 5/1993 | Suzuki et al. | 252/299.67 |
| 5,262,086 | 11/1993 | Suzuki et al. | 252/299.65 |
| 5,316,694 | 5/1994 | Murashiro et al. | 252/299.61 |
| 5,330,678 | 7/1994 | Okabe et al. | 252/299.62 |
| 5,344,586 | 9/1994 | Suzuki et al. | 252/299.64 |
| 5,352,382 | 10/1994 | Johno et al. | 252/299.65 |
| 5,356,562 | 10/1994 | Greenfield et al. | 252/299.63 |
| 5,374,375 | 12/1994 | Yui et al. | 252/299.65 |
| 5,378,392 | 1/1995 | Murashiro et al. | 252/299.01 |
| 5,378,396 | 1/1995 | Yui et al. | 252/299.65 |
| 5,393,460 | 2/1995 | Okabe et al. | 252/299.65 |
| 5,417,885 | 5/1995 | Suzuki et al. | 252/299.65 |
| 5,534,190 | 7/1996 | Johno et al. | 252/299.65 |

FOREIGN PATENT DOCUMENTS

| | | |
|---|---|---|
| 0 330 491 A2 | 6/1989 | European Pat. Off. . |
| 0 339 987 A2 | 11/1989 | European Pat. Off. . |
| 0 517 504 A1 | 12/1992 | European Pat. Off. . |
| 0 525 737 A1 | 2/1993 | European Pat. Off. . |
| 0 562 627 A1 | 9/1993 | European Pat. Off. . |
| 0 582 468 A1 | 2/1994 | European Pat. Off. . |
| 0 582 519 A1 | 2/1994 | European Pat. Off. . |
| 1-139551 | 6/1989 | Japan . |
| 1-213390 | 8/1989 | Japan . |
| 1-316339 | 12/1989 | Japan . |
| 1-316367 | 12/1989 | Japan . |
| 2-028128 | 1/1990 | Japan . |
| 2-069440 | 3/1990 | Japan . |
| 2-275839 | 11/1990 | Japan . |
| 3-5441 | 1/1991 | Japan . |
| 3-83951 | 4/1991 | Japan . |
| 3-123759 | 5/1991 | Japan . |
| 3-292388 | 12/1991 | Japan . |
| 5-65486 | 3/1993 | Japan . |
| 5-230032 | 9/1993 | Japan . |

OTHER PUBLICATIONS

Nishiyama et al; "Effect of Size of the Lateral Substituent at the Chiral Centre on the Stability of some Chiral Smectic Liquid–crystalline Phases", Journal Of Materials Chemistry, vol. 3, No. 2, 1993, pp. 149–159.

Suzuki et al: "New Fluorine–containing Ferroelectric Liquid Crystal Compounds Showing Tristable Switching", Liquid Crystals, 1989, vol. 6, No. 2, pp. 167–174.

Derwent Publications, JP 6 271 852 A, 1994.

Chandani et al: "Tristable Switching in Surface Stabilized Ferroelectric Liquid Crytals with a Large Spontaneous Polarization", Japanese Journal Of Applied Physics, vol. 27, No. 5, May 1988, pp. L729–L932.

Meyer: "Ferroelectric Liquid Crystals; a Review", Mol-cryst.Liq.Cryst., 1977, vol. 40, pp. 33–48.

*Primary Examiner*—Shean C. Wu
*Attorney, Agent, or Firm*—Cushman, Darby & Cushman IP Group of Pillsbury Madison & Sutro LLP

[57] ABSTRACT

Antiferroelectric liquid crystal compositions which employ mixtures of antiferroelectric liquid crystal compounds represented by general formulas (1) and (2), and also antiferroelectric liquid crystal compounds represented by general formula (3).

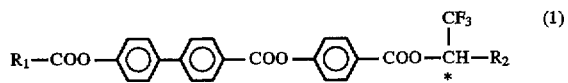

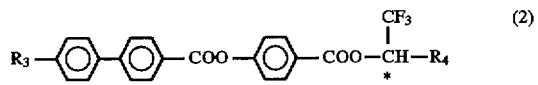

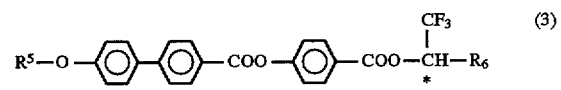

wherein $R_1$–$R_6$ are alkyl groups, and one or more of the 4 hydrogen atoms of each of the phenyl groups in the formulas may be replaced with a fluorine atom.

9 Claims, 1 Drawing Sheet

ANTIFERROELECTRIC LIQUID CRYSTAL COMPOSITION

BACKGROUND OF THE INVENTION

1. Field of the Invention

The present invention relates to an antiferroelectric liquid crystal composition suitable for use in liquid crystal display elements which utilize responses to electric fields of antiferroelectric liquid crystals.

2. Description of the Related Art

Liquid crystal displays have come into wide use in display elements which take advantage of their properties such as thinness, lightweightness and low power consumption, and most display apparatuses are TN (Twisted Nematic) types which employ nematic crystals. The display method of these TN-types, driven based on the anisotropy of the relative dielectric constant of the liquid crystals, results in a slow response speed which has been in need of improvement.

In contrast, liquid crystal devices employing chiral smectic C (abbreviated as $S_C^*$) liquid crystals exhibiting ferroelectric properties, which were discovered by Meyer et al., have high-speed responses and memory characteristics which were not achievable with nematic liquid crystals, and active efforts are being made in research toward the application of these properties to ferroelectric liquid crystal displays. However, in actual cells it has been difficult to realize the good orientation and memory characteristics required for this display method, while a number of other problems remain to be solved including susceptibility to external shock.

Chandani, et al. have discovered the antiferroelectric phase ($S_{CA}^*$ phase) which exhibits a third stable state at the low temperature end of the $S_C$ phase. These antiferroelectric liquid crystals exhibit a thermodynamically stable phase at each adjacent layer wherein the dipoles are oriented in an anti-parallel manner, and this causes a field induced phase transfer between the antiferroelectric phase-ferroelectric phase which is characterized by a clear threshold value for applied voltage and double hysteresis. New methods of display are being investigated using this switching behavior.

When antiferroelectric liquid crystals are applied in display elements, conventionally known antiferroelectric liquid crystal materials are not necessarily preferred in consideration of the liquid crystal temperature range exhibiting the antiferroelectric phase, the threshold voltage for driving, and the display characteristics. In light of these circumstances, it is an object of the present invention to provide an antiferroelectric liquid crystal composition with an improved liquid crystal temperature range, threshold voltage and display characteristics.

DESCRIPTION OF THE INVENTION

The present invention relates to an antiferroelectric liquid crystal composition characterized by containing at least one antiferroelectric liquid crystal compound represented by general formula (1) and at least one antiferroelectric liquid crystal compound represented by general formula (2).

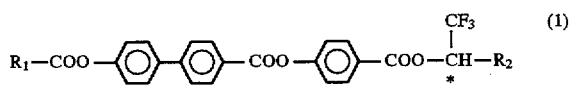

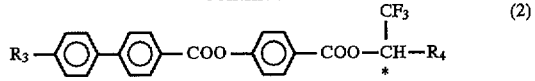

wherein $R_1$ and $R_3$ are alkyl groups of 7–13 carbon atoms and $R_2$ and $R_4$ are alkyl groups of 4–8 carbon atoms; and one or more of the 4 hydrogen atoms of each of the phenyl groups in formulas (1) and (2) may be submitted by a fluorine atom.

The same effect is provided by an antiferroelectric liquid crystal composition characterized by comprising in addition to at least one each of the antiferroelectric liquid crystal compounds represented by general formulas (1) and (2) above, at least one antiferroelectric liquid crystal compound represented by the following general formula (3).

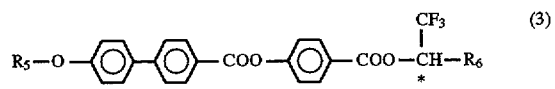

wherein $R_5$ is an alkyl group of 7–13 carbon atoms and $R_6$ is an alkyl group of 4–8 carbon atoms; and one or more of the 4 hydrogen atoms of each of the phenyl groups in formula (3) may be replaced with a fluorine atom.

The compounds represented by general formulas (1), (2) and (3) above may be prepared according to the method described in Japanese Unexamined Patent Publication No. 1-139551 or Japanese Unexamined Patent Publication No. 2-69440, or by a combination of the methods described in these publications with a publicly known organic synthesis unit process.

The mixing ratio of the antiferroelectric liquid crystal compound represented by general formula (1) and the antiferroelectric liquid crystal compound represented by general formula (2) is not particularly restricted since an effect will be achieved by the mixture, but for a more notable effect the weight ratio is generally 20:80–80:20, preferably 30:70–70:30, and more preferably 40:60–60:40.

The mixing ratio when an antiferroelectric liquid crystal compound represented by general formula (3) is added is also not restricted since an effect is achieved by admixture, but for a more notable effect the weight ratio is 10%–40%, and more preferably 20%–40%.

The compounds represented by the general formulas given below are suitable as antiferroelectric liquid crystal compounds represented by general formula (1), since they exhibit antiferroelectric characteristics over a wide temperature range:

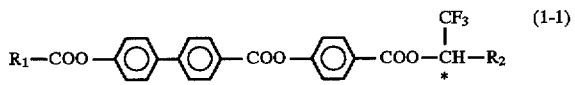

wherein $R_1$ is selected from linear alkyl groups of 8, 9, 10, 11 and 12 carbon atoms, and $R_2$ is selected from linear alkyl groups of 4, 5, 6 and 8 carbon atoms;

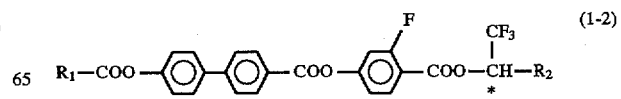

Wherein $R_1$ is selected from linear alkyl groups of 8, 9, 10, 11 and 12 carbon atoms, and $R_2$ is selected from linear alkyl groups of 4, 5, 6 and 8 carbon atoms;

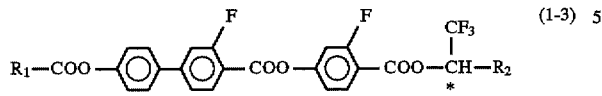
(1-3)

wherein $R_1$ is selected from linear alkyl groups of 8, 9, 10, 11 and 12 carbon atoms, and $R_2$ is selected from linear alkyl groups of 4, 5, 6 and 8 carbon atoms;

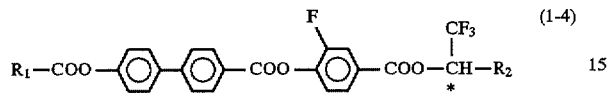
(1-4)

Wherein $R_1$ is selected from linear alkyl groups of 8, 9, 10, 11 and 12 carbon atoms, and $R_2$ is selected from linear alkyl groups of 4, 5, 6 and 8 carbon atoms.

The compounds represented by the general formulas given below are suitable as antiferroelectric liquid crystal compounds represented by general formula (2), since they exhibit antiferroelectric characteristics over a wide temperature range:

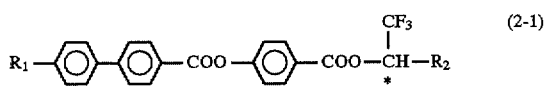
(2-1)

wherein $R_1$ is selected from linear alkyl groups of 8, 9, 10, 11 and 12 carbon atoms, and $R_2$ is selected from linear alkyl groups of 4, 5, 6 and 8 carbon atoms;

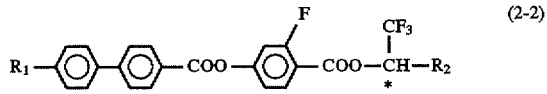
(2-2)

Wherein $R_1$ is selected from linear alkyl groups of 8, 9, 10, 11 and 12 carbon atoms, and $R_2$ is selected from linear alkyl groups of 4, 5, 6 and 8 carbon atoms;

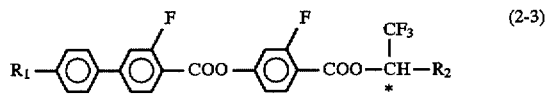
(2-3)

wherein $R_1$ is selected from linear alkyl groups of 8, 9, 10, 11 and 12 carbon atoms, and $R_2$ is selected from linear alkyl groups of 4, 5, 6 and 8 carbon atoms;

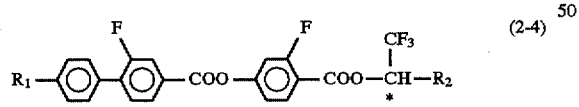
(2-4)

wherein $R_1$ is selected from linear alkyl groups of 8, 9, 10, 11 and 12 carbon atoms, and $R_2$ is selected from linear alkyl groups of 4, 5, 6 and 8 carbon atoms.

The compounds represented by the following general formulas (3-1) to (3-6) are suitable as antiferroelectric liquid crystal compounds represented by general formula (3), since they exhibit antiferroelectric characteristics over a wide temperature range:

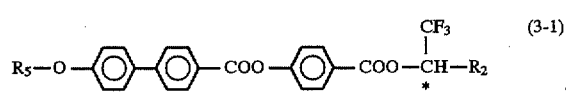
(3-1)

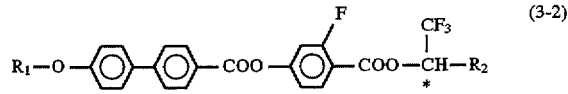
(3-2)

wherein $R_1$ is selected from linear alkyl groups of 8, 9, 10, 11 and 12 carbon atoms, and $R_2$ is selected from linear alkyl groups of 4, 5, 6 and 8 carbon atoms;

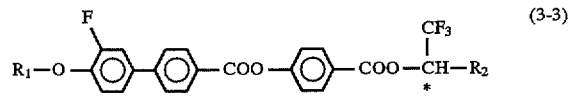
(3-3)

wherein $R_1$ is selected from linear alkyl groups of 8, 9, 10, 11 and 12 carbon atoms, and $R_2$ is selected from linear alkyl groups of 4, 5, 6 and 8 carbon atoms;

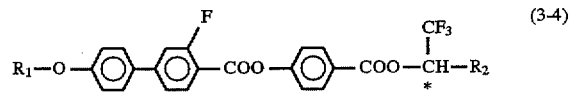
(3-4)

wherein $R_1$ is selected from linear alkyl groups of 8, 9, 10, 11 and 12 carbon atoms, and $R_2$ is selected from linear alkyl groups of 4, 5, 6 and 8 carbon atoms;

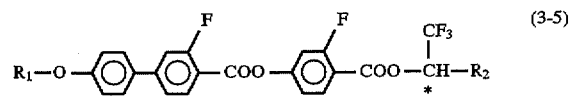
(3-5)

wherein $R_1$ is selected from linear alkyl groups of 8, 9, 10, 11 and 12 carbon atoms, and $R_2$ is selected from linear alkyl groups of 4, 5, 6 and 8 carbon atoms;

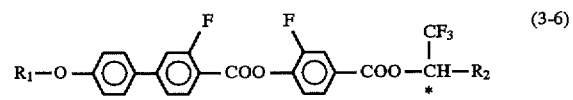
(3-6)

wherein $R_1$ is selected from linear alkyl groups of 8, 9, 10, 11 and 12 carbon atoms, and $R_2$ is selected from linear alkyl groups of 4, 5, 6 and 8 carbon atoms.

The present invention has a sufficiently wide liquid crystal temperature range and a low driving voltage, and exhibits satisfactory display characteristics.

EXAMPLES

Example 1

Liquid crystal compositions A, B and C were prepared with the compositional ratios listed in Table 2, using compounds No. 1 to No. 4 listed in Table 1.

TABLE 1

Structural formula

No. 1  (R) $C_{10}H_{21}$—COO—⟨⟩—⟨⟩—COO—⟨⟩—COO—$\overset{CF_3}{\underset{*}{C}H}$—$C_6H_{13}$ No. 2  (R) $C_8H_{17}$—COO—⟨⟩—⟨⟩—COO—⟨⟩(F)—COO—$\overset{CF_3}{\underset{*}{C}H}$—$C_6H_{13}$ No. 3  (R) $C_{10}H_{21}$—⟨⟩—⟨⟩—COO—⟨⟩—COO—$\overset{CF_3}{\underset{*}{C}H}$—$C_6H_{13}$ No. 4  (R) $C_{10}H_{21}$—⟨⟩—⟨⟩—COO—⟨⟩(F)—COO—$\overset{CF_3}{\underset{*}{C}H}$—$C_8H_{17}$

TABLE 2

| Composition | Compositional ratio | |
|---|---|---|
| A | Compound No. 1 | 50 wt % |
|   | Compound No. 2 | 50 wt % |
| B | Compound No. 3 | 50 wt % |
|   | Compound No. 4 | 50 wt % |
| C | Composition A | 50 wt % |
|   | Composition B | 50 wt % |

The liquid crystal compositions were each poured into a cell formed by 2 glass pieces placed together at a spacing of 2 μm, each of the surfaces of which had been coated with a transparent electrode and polyimide oriented film and subjected to orientating treatment by rubbing. Each cell was heated to a temperature at which the poured liquid crystal composition changed to an isotropic liquid, and was then cooled to room temperature at 2° C./min to obtain an antiferroelectric liquid crystal element.

Figure 1:
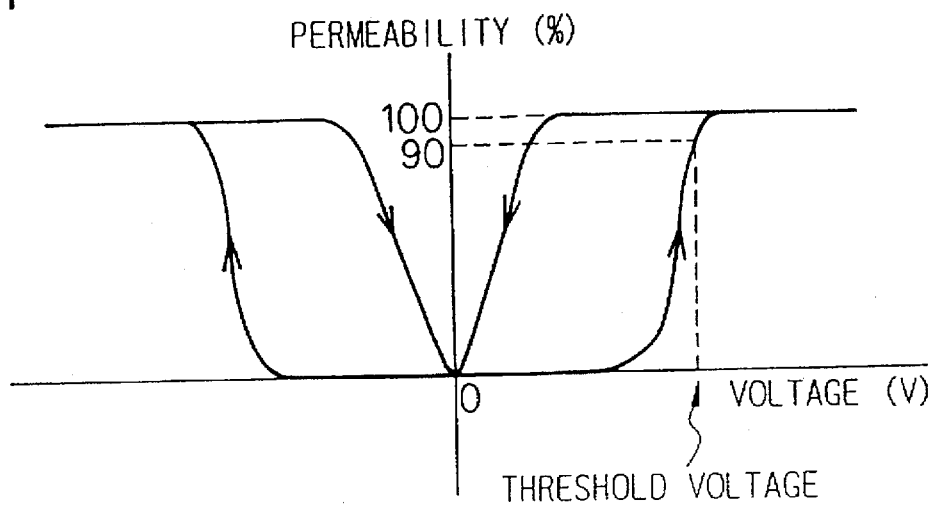
FIG. 1 is a graph showing double hysteresis of voltage and transmissivity curves for an antiferroelectric liquid crystal composition.

A 1 Hz, ±50 V triangular wave was applied to the element, after which the transmitted light intensity was measured under crossed nicols and the threshold voltage was determined. As shown in FIG. 1, the threshold voltage was defined as the voltage at which the transmissivity of the rising double hysteresis curve exceeded 90%.

The threshold voltages for compositions A, B and C at 50° C. were 41.0 V, 21.7 V and 32.4 V. The threshold voltage is preferably lower for driving of display elements.

The components of composition A all consist of antiferroelectric liquid crystal compounds represented by general formula (1) of claim 1, and the threshold voltages were high values exceeding 40 V, which is of low practical value.

Table 3 shows the phase systems for compositions A, B and C. The temperature range for the $S_{CA}*$ phase restricts the usable temperature range when used as a display element, and is therefore a wide temperature range. In particular, considering the environments where display elements are used, the maximum temperature of the $S_{CA}*$ phase must be 60° C. or higher, and preferably 70° C. or higher.

TABLE 3

| Liquid crystal material | Phase transition temperature (°C.) | | | | | | |
|---|---|---|---|---|---|---|---|
|  | Cry | — | $S_{CA}*$ | — | $S_A$ | — | I |
| Composition A | • | 46.3 | • | 103.8 | • | 113.5 | • |
| Composition B | • | — | • | 55.4 | • | 56.3 | • |
| Composition C | • | 22.8 | • | 77.8 | • | 83.6 | • |

The components of composition B all consist of antiferroelectric liquid crystal compounds represented by general formula (2) of claim 1, and the maximum temperature was 55.4° C., which is of low practical value.

Figure 2A:
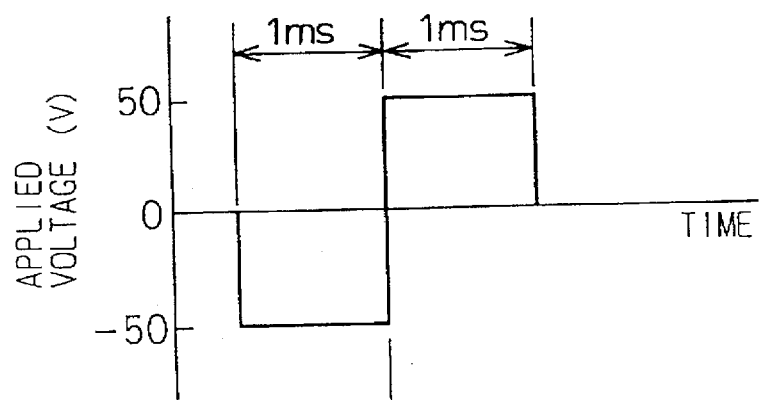
FIG. 2A shows the voltage applied to a liquid crystal composition to determine the response time for a liquid crystal composition.
Figure 2B:
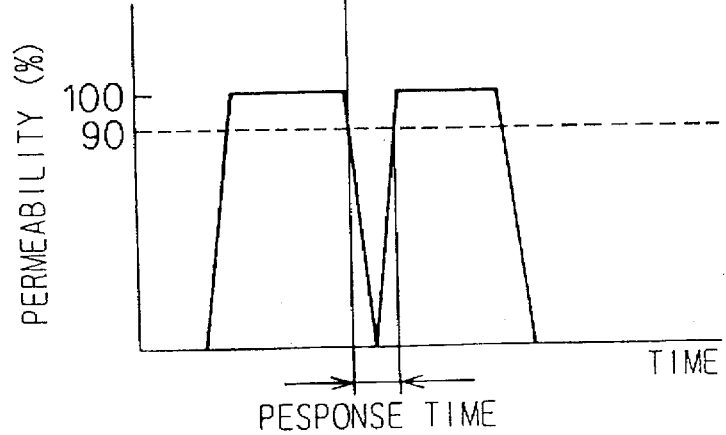
FIG. 2B shows the change in transmissivity of the liquid crystal composition upon application of the voltage shown in FIG. 2A.

However, composition C according to the invention had a practical temperature of 77.8° C. for the maximum temperature of the $S_{CA}*$ phase at the threshold voltage of 32.4 V. The response time of the antiferroelectric liquid crystal element was also measured based on the definition in FIG. 2, applying a voltage with a field strength of ±50 V. That is, when application of a voltage of −50 V for 1 ms is followed by application of the voltage switched to +50 V for 1 ms (FIG. 2A), the transmissivity of the liquid crystal composition falls at first but then rises again, and the response time is recorded as the time required for the transmissivity to return to 90% after falling from the initial 90%. The response time of composition C at 50° C. was 14.1 μs, thus demonstrating satisfactory characteristics.

Example 2

Liquid crystal compositions D and E were prepared with the compositional ratios listed in Table 5, using compounds No. 5 and 6 listed in Table 4.

TABLE 4

Structural formula

No. 5

(R) C$_8$H$_{17}$—O—⬡—⬡—COO—⬡—COO—CH(CF$_3$)—C$_6$H$_{13}$
*

No. 6

(R) C$_{10}$H$_{21}$—O—⬡—⬡—(F)COO—⬡(F)—COO—CH(CF$_3$)—C$_8$H$_{17}$
*

TABLE 5

| Composition | Compositional ratio | |
|---|---|---|
| D | Compound No. 5 | 50 wt % |
|   | Compound No. 6 | 50 wt % |
| E | Composition A | 30 wt % |
|   | Composition B | 40 wt % |
|   | Composition D | 30 wt % |

The phase systems of compositions D and E are shown in Table 6. The maximum temperature for the $S_{CA}^*$ phase was 87.3° C. for composition D and 78.5 for composition E, thus demonstrating satisfactory characteristics.

TABLE 6

| Liquid crystal material | Phase transition temperature (°C.) | | | | | | |
|---|---|---|---|---|---|---|---|
| | $C_{ry}$ | — | $S_{CA}^*$ | — | $S_A$ | — | I |
| Composition D | • | 60.9 | • | 87.3 | • | 98.5 | • |
| Composition E | • | — | • | 78.5 | • | 85.1 | • |

The components of composition D all consist of antiferroelectric liquid crystal compounds represented by general formula (3) of claim 2, and the threshold voltage was a high value of 41.3 V, which is of low practical value.

In contrast, composition E according to the invention had a practical threshold voltage of 32.7 V. Also, the response time of composition E at 50° C. was 14.0 μs, thus demonstrating satisfactory characteristics.

Example 3

Liquid crystal composition F was prepared with the compositional ratio listed in Table 8, using compound No. 3 listed in Table 1 and compound No. 7 listed in Table 7.

TABLE 7

Structural formula

No. 7

(R) C$_9$H$_{19}$—COO—⬡—⬡(F)—COO—⬡(F)—COO—CH(CF$_3$)—C$_4$H$_9$
*

No. 8

(R) C$_{10}$H$_{21}$—O—⬡—⬡—COO—⬡(F)—COO—CH(CF$_3$)—C$_6$H$_{13}$
*

No. 9

(R) C$_9$H$_{19}$—⬡—⬡—COO—⬡(F)—COO—CH(CF$_3$)—C$_4$H$_{19}$
*

No. 10

(R) C$_9$H$_{19}$—⬡—⬡(F)—COO—⬡(F)—COO—CH(CF$_3$)—C$_5$H$_{11}$
*

TABLE 7-continued

Structural formula

No. 11 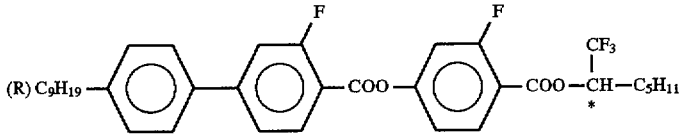

No. 12 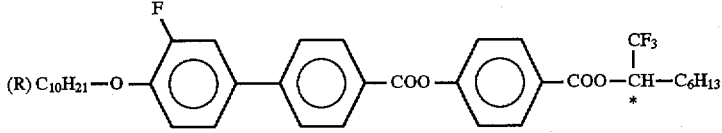

No. 13 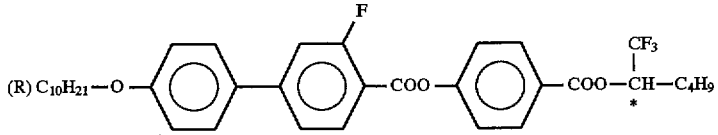

No. 14 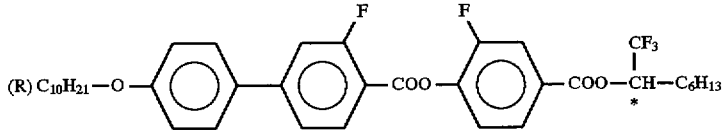

TABLE 8

| Composition | Compositional ratio | |
|---|---|---|
| F | Compound No. 3 | 50 wt % |
|   | Compound No. 7 | 50 wt % |
| G | Composition F | 80 wt % |
|   | Compound No. 8 | 20 wt % |
| H | Compound No. 9 | 25 wt % |
|   | Compound No. 10 | 10 wt % |
|   | Compound No. 11 | 25 wt % |
|   | Compound No. 12 | 10 wt % |
|   | Compound No. 13 | 15 wt % |
|   | Compound No. 14 | 15 wt % |

The threshold voltage of compound No. 3 at 50° C. was a practical value of 25.3 V, but the maximum temperature of the $S_{CA}*$ phase was 65.0° C., which is not preferred in terms of practicality. The threshold voltage of compound No. 7 at 50° C. was a poorly practical value of 48.1 V, but the maximum temperature of the $S_{CA}*$ phase was a desirable value of 101.5° C.

Table 9 shows the phase system for composition F according to the invention for contrast. The maximum temperature of the $S_{CA}*$ phase was 78.9° C., thus demonstrating satisfactory characteristics. Also, the threshold voltage of composition F at 50° C. was a practical value of 36.7 V. The response time of composition F of 11.2 μs at 50° C. also indicated satisfactory characteristics.

TABLE 9

| Liquid crystal material | Phase transition temperature (°C.) | | | | | | |
|---|---|---|---|---|---|---|---|
|   | $C_{ry}$ | — | $S_{CA}*$ | — | $S_A$ | — | I |
| Composition F | • | — | • | 78.9 | • | 85.3 | • |
| Composition G | • | — | • | 83.0 | • | 88.0 | • |
| Composition H | • | — | • | 67.0 | • | 80.7 | • |

Example 4

Liquid crystal composition G was prepared with the compositional ratio listed in Table 8, using composition F of Example 3 and compound No. 8 listed in Table 7.

The threshold voltage of compound No. 8 at 50° C. was a poorly practical value of 53.4 V, but the maximum temperature of the $S_{CA}*$ phase was a desirable value of 96.5° C.

Table 9 shows the phase system for composition G according to the invention. The maximum temperature of the $S_{CA}*$ phase was 83.0° C., and thus a higher maximum temperature was obtained than with composition F. Also, the threshold voltage of composition G at 50° C. was a practical value of 39.9 V. The response time of composition G of 12.5 μs at 50° C. indicated satisfactory characteristics.

Example 5

Liquid crystal composition H was prepared with the compositional ratio listed in Table 8, using compounds No. 9, 10, 11, 12, 13 and 14 listed in Table 7.

Table 9 shows the phase system for composition H. The maximum temperature of the $S_{CA}*$ phase was 67.0° C., thus indicating practical characteristics. The threshold voltage of composition H at 50° C. was an excellent value of 23.9 V. The response time of composition H of 10.3 μs at 50° C. indicated satisfactory characteristics.

We claim:

1. An antiferroelectric liquid crystal composition comprising at least one of a first antiferroelectric liquid crystal compound represented by general formula (1) and at least one of a second antiferroelectric liquid crystal compound represented by general formula (2):

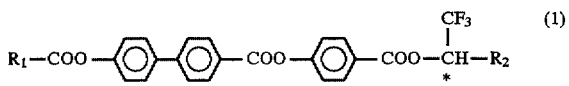 (1)

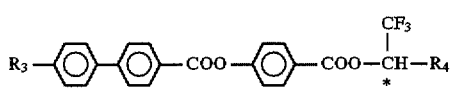 (2)

wherein $R_1$ and $R_3$ are alkyl groups of 7–13 carbon atoms and $R_2$ and $R_4$ are alkyl groups of 4–8 carbon atoms; and one or more of the 4 hydrogen atoms of each of the phenyl groups in formulas (1) and (2) may be substituted by a fluorine atom.

2. An antiferroelectric liquid crystal composition according to claim 1 further comprising at least one of a third antiferroelectric liquid crystal compound represented by the following general formula (3):

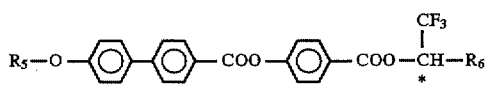 (3)

wherein $R_5$ is an alkyl group of 7–13 carbon atoms and $R_6$ is an alkyl group of 4–8 carbon atoms; and one or more of the 4 hydrogen atoms of each of the phenyl groups in formula (3) may be replaced with a fluorine atom.

3. An antiferroelectric liquid crystal composition according to claim 1, wherein said first antiferroelectric liquid crystal compound comprises at least one compound selected from the group consisting compounds represented by the following general formulas (1-1), (1-2), (1-3) and (1-4):

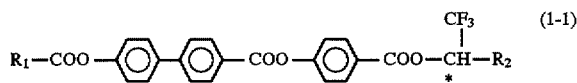 (1-1)

wherein $R_1$ is selected from linear alkyl groups of 8, 9, 10, 11 and 12 carbon atoms, and $R_2$ is selected from linear alkyl groups of 4, 5, 6 and 8 carbon atoms;

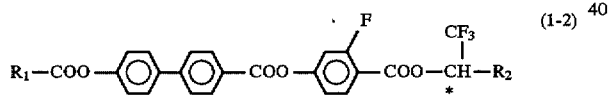 (1-2)

wherein $R_1$ is selected from linear alkyl groups of 8, 9, 10, 11 and 12 carbon atoms, and $R_2$ is selected from linear alkyl groups of 4, 5, 6 and 8 carbon atoms;

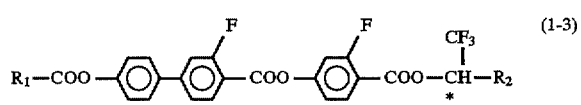 (1-3)

wherein $R_1$ is selected from linear alkyl groups of 8, 9, 10, 11 and 12 carbon atoms, and $R_2$ is selected from linear alkyl groups of 4, 5, 6 and 8 carbon atoms;

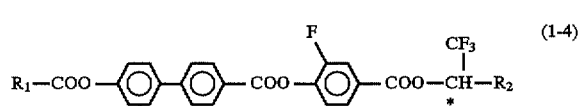 (1-4)

wherein $R_1$ is selected from linear alkyl groups of 8, 9, 10, 11 and 12 carbon atoms, and $R_2$ is selected from linear alkyl groups of 4, 5, 6 and 8 carbon atoms; and said second antiferroelectric liquid crystal compound comprises at least one compound selected from the group consisting of compounds represented by the following general groups (2-1), (2-2), (2-3) and (2-4):

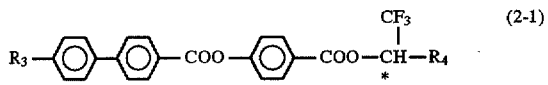 (2-1)

wherein $R_3$ is selected from linear alkyl groups of 8, 9, 10, 11 and 12 carbon atoms, and $R_4$ is selected from linear alkyl groups of 4, 5, 6 and 8 carbon atoms;

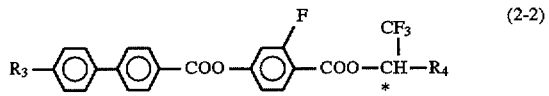 (2-2)

wherein R3 is selected from linear alkyl groups of 8, 9, 10, 11 and 12 carbon atoms, and $R_4$ is selected from linear alkyl groups of 4, 5, 6 and 8 carbon atoms;

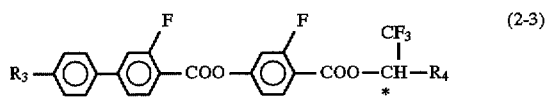 (2-3)

wherein $R_3$ is selected from linear alkyl groups of 8, 9, 10, 11 and 12 carbon atoms, and $R_4$ is selected from linear alkyl groups of 4, 5, 6 and 8 carbon atoms;

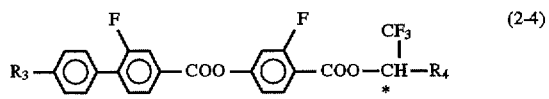 (2-4)

wherein $R_3$ is selected from linear alkyl groups of 8, 9, 10, 11 and 12 carbon atoms, and $R_4$ is selected from linear alkyl groups of 4, 5, 6 and 8 carbon atoms.

4. An antiferroelectric liquid crystal composition according to claim 2, wherein said third antiferroelectric liquid crystal compound comprises at least one compound selected from the group consisting of compounds represented by the following general formulas (3-1) through (3-6):

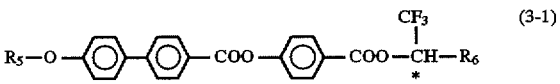 (3-1)

wherein $R_5$ is selected from linear alkyl groups of 8, 9, 10, 11 and 12 carbon atoms, and $R_6$ is selected from linear alkyl groups of 4, 5, 6 and 8 carbon atoms;

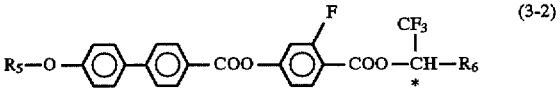 (3-2)

wherein $R_5$ is selected from linear alkyl groups of 8, 9, 10, 11 and 12 carbon atoms, and $R_6$ is selected from linear alkyl groups of 4, 5, 6 and 8 carbon atoms;

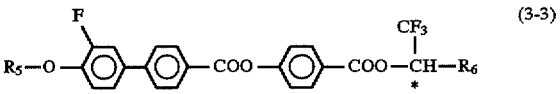 (3-3)

wherein $R_5$ is selected from linear alkyl groups of 8, 9, 10, 11 and 12 carbon atoms, and $R_6$ is selected from linear alkyl groups of 4, 5, 6 and 8 carbon atoms;

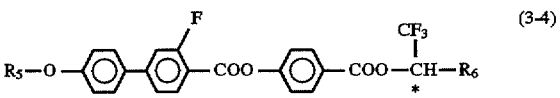 (3-4)

wherein $R_5$ is selected from linear alkyl groups of 8, 9, 10, 11 and 12 carbon atoms, and $R_6$ is selected from linear alkyl groups of 4, 5, 6 and 8 carbon atoms;

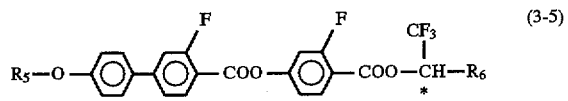
(3-5)

wherein $R_5$ is selected from linear alkyl groups of 8, 9, 10, 11 and 12 carbon atoms, and $R_6$ is selected from linear alkyl groups of 4, 5, 6 and 8 carbon atoms;

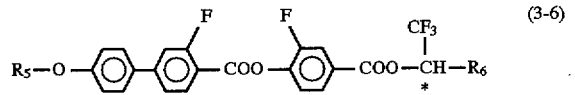
(3-6)

wherein $R_5$ is selected from linear alkyl groups of 8, 9, 10, 11 and 12 carbon atoms, and $R_6$ is selected from linear alkyl groups of 4, 5, 6 and 8 carbon atoms.

5. An antiferroelectric liquid crystal composition according to claim 1, wherein the weight ratio of said first antiferroelectric liquid crystal compound and said second antiferroelectric liquid crystal compound is between 20:80 and 80:20.

6. An antiferroelectric liquid crystal composition according to claim 1, wherein the weight ratio of said first antiferroelectric liquid crystal compound and said second antiferroelectric liquid crystal compound is between 30:70 and 70:30.

7. An antiferroelectric liquid crystal composition according to claim 1, wherein the weight ratio of said first antiferroelectric liquid crystal compound and said second antiferroelectric liquid crystal compound is between 40:60 and 60:40.

8. An antiferroelectric liquid crystal composition according to claim 2, wherein said third antiferroelectric liquid crystal compound is added at 10–40% of said liquid crystal composition.

9. An antiferroelectric liquid crystal composition according to claim 2, wherein said third antiferroelectric liquid crystal compound is added at 20–40% of said liquid crystal composition.

* * * * *